United States Patent
Hawa et al.

(10) Patent No.: US 11,829,583 B2
(45) Date of Patent: Nov. 28, 2023

(54) SYSTEMS AND METHODS FOR CONTENT SHARING THROUGH EXTERNAL SYSTEMS

(71) Applicant: Open Text SA ULC, Halifax (CA)

(72) Inventors: Raja Elias Hawa, Ottawa (CA); David Andrew Templeton, Drumbo (CA)

(73) Assignee: Open Text SA ULC, Halifax (CA)

( * ) Notice: Subject to any disclaimer, the term of this patent is extended or adjusted under 35 U.S.C. 154(b) by 355 days.

(21) Appl. No.: 15/902,311

(22) Filed: Feb. 22, 2018

(65) Prior Publication Data

US 2019/0012053 A1    Jan. 10, 2019

Related U.S. Application Data

(60) Provisional application No. 62/529,617, filed on Jul. 7, 2017.

(51) Int. Cl.
*G06F 16/176* (2019.01)
*G06F 3/0484* (2022.01)
(Continued)

(52) U.S. Cl.
CPC .......... *G06F 3/0484* (2013.01); *G06F 3/0481* (2013.01); *G06F 3/0482* (2013.01);
(Continued)

(58) Field of Classification Search
CPC .... G06Q 10/06; G06Q 10/087; G06Q 10/101; G06Q 10/103; G06Q 10/20; G06Q 20/10;
(Continued)

(56) References Cited

U.S. PATENT DOCUMENTS 7,584,274 B2 *   9/2009   Bond ................... G06F 9/5027
                                                 709/223
8,190,850 B1 *   5/2012   Davenport ............. G06F 16/10
                                                 711/202
(Continued)

FOREIGN PATENT DOCUMENTS

EP   1517260 A   3/2005
EP   2996026 A   3/2016

OTHER PUBLICATIONS

Office Action issued for U.S. Appl. No. 15/906,846, dated Jul. 18, 2019, 17 pages.
(Continued)

*Primary Examiner* — Tony Mahmoudi
*Assistant Examiner* — Linh Black
(74) *Attorney, Agent, or Firm* — Sprinkle IP Law Group

(57) ABSTRACT

Responsive to a request to share managed content with a user of an external system, a content server in an enterprise computing environment makes a copy of the managed content, sends the copy with information identifying the user of the external system to the external system, establishes a revocable link between the managed content in the repository and the copy in the external system, locks the managed content in the repository, and indicates to the requesting user that the managed content is locked from editing. Responsive to a request to stop sharing, the content server revokes the link and notifies the external system that sharing has been revoked. If the copy has been modified, the content server retrieves a modified version of the copy from the external system and saves the modified version as a new version of the managed content in the repository.

20 Claims, 9 Drawing Sheets

(51) Int. Cl.

| | |
|---|---|
| *G06F 16/182* | (2019.01) |
| *G06F 3/0481* | (2022.01) |
| *G06F 3/0482* | (2013.01) |
| *H04L 67/1095* | (2022.01) |
| *G06F 40/166* | (2020.01) |
| *G06F 40/197* | (2020.01) |
| *G06F 16/178* | (2019.01) |
| *G06F 9/54* | (2006.01) |
| *H04L 41/12* | (2022.01) |
| *H04L 41/22* | (2022.01) |
| *H04L 43/045* | (2022.01) |
| *H04L 67/10* | (2022.01) |
| *H04L 67/141* | (2022.01) |
| *H04L 67/02* | (2022.01) |
| *H04L 67/01* | (2022.01) |

(52) U.S. Cl.
CPC .............. *G06F 9/541* (2013.01); *G06F 9/547* (2013.01); *G06F 16/176* (2019.01); *G06F 16/178* (2019.01); *G06F 16/1774* (2019.01); *G06F 16/183* (2019.01); *G06F 40/166* (2020.01); *G06F 40/197* (2020.01); *H04L 41/12* (2013.01); *H04L 41/22* (2013.01); *H04L 43/045* (2013.01); *H04L 67/10* (2013.01); *H04L 67/1095* (2013.01); *H04L 67/01* (2022.05); *H04L 67/02* (2013.01); *H04L 67/141* (2013.01)

(58) Field of Classification Search
CPC .. G06Q 20/405; G06Q 30/0222; G06Q 30/04; G06Q 40/123; G06Q 40/125; Y04S 10/54; G06F 16/176; G06F 16/27; G06F 19/3418; G06F 21/10; G06F 21/6209; G06F 7/00; H04W 12/0609
USPC ....... 707/705, 694, 695, 782–783, 785, 726, 707/795, 800, 818, 17.011, E17.116
See application file for complete search history.

(56) References Cited

U.S. PATENT DOCUMENTS

| | | | |
|---|---|---|---|
| 8,229,899 B2* | 7/2012 | Anderson | G06F 16/10 707/690 |
| 9,104,742 B1 | 8/2015 | Wei | |
| 9,703,800 B1 | 7/2017 | Korshunov et al. | |
| 10,055,474 B1 | 8/2018 | Wei | |
| 10,210,172 B1 | 2/2019 | Konig et al. | |
| 10,223,328 B1 | 3/2019 | Wei | |
| 10,635,272 B2 | 4/2020 | Rao et al. | |
| 11,194,451 B2 | 12/2021 | Rao et al. | |
| 2003/0079030 A1* | 4/2003 | Cocotis | H04L 67/5651 709/229 |
| 2004/0162872 A1* | 8/2004 | Friedman | H04L 29/06 709/203 |
| 2005/0144195 A1* | 6/2005 | Hesselink | H04L 63/029 |
| 2005/0246389 A1* | 11/2005 | Shah | G06F 9/52 |
| 2007/0157203 A1 | 7/2007 | Lim | |
| 2007/0226169 A1 | 9/2007 | Solyanik et al. | |
| 2009/0210459 A1 | 8/2009 | Nair et al. | |
| 2009/0320035 A1 | 12/2009 | Ahlgren et al. | |
| 2010/0031149 A1* | 2/2010 | Gentile | G11B 27/34 348/135 |
| 2010/0179984 A1* | 7/2010 | Sebastian | H04L 67/10 709/203 |
| 2013/0013560 A1* | 1/2013 | Goldberg | G06Q 10/101 707/634 |
| 2013/0173532 A1 | 7/2013 | Xie | |
| 2013/0318589 A1* | 11/2013 | Ford | H04L 63/0428 726/7 |
| 2014/0047560 A1* | 2/2014 | Meyer | G06F 21/10 726/28 |
| 2014/0108505 A1 | 4/2014 | Li et al. | |
| 2014/0115329 A1* | 4/2014 | Sturonas | G06F 21/6218 713/165 |
| 2014/0164776 A1* | 6/2014 | Hook | G06F 21/6218 713/171 |
| 2014/0165176 A1* | 6/2014 | Ow | H04L 63/10 726/8 |
| 2014/0189818 A1* | 7/2014 | Meyer | H04L 51/08 726/4 |
| 2014/0245015 A1* | 8/2014 | Velamoor | G06F 21/10 713/171 |
| 2014/0279526 A1* | 9/2014 | Jackson | G06Q 20/405 705/44 |
| 2015/0058289 A1* | 2/2015 | Do | G06F 16/2386 707/613 |
| 2015/0100503 A1 | 4/2015 | Lobo et al. | |
| 2015/0134795 A1* | 5/2015 | Theimer | G06F 16/254 709/223 |
| 2015/0134808 A1* | 5/2015 | Fushman | G06Q 30/02 709/224 |
| 2015/0135337 A1* | 5/2015 | Fushman | G06F 16/9558 726/30 |
| 2015/0149456 A1 | 5/2015 | Meyers et al. | |
| 2015/0163206 A1* | 6/2015 | McCarthy | H04L 63/104 726/4 |
| 2015/0310188 A1* | 10/2015 | Ford | G06F 21/10 726/28 |
| 2015/0371057 A1* | 12/2015 | Ow | H04L 63/10 726/28 |
| 2016/0277368 A1 | 9/2016 | Narayanaswammy et al. | |
| 2016/0277374 A1 | 9/2016 | Reid et al. | |
| 2017/0041296 A1* | 2/2017 | Ford | G06F 21/64 |
| 2017/0046807 A1* | 2/2017 | Ford | G06Q 10/103 |
| 2017/0075921 A1 | 3/2017 | Benton et al. | |
| 2017/0220657 A1 | 8/2017 | Nivala et al. | |
| 2018/0041567 A1* | 2/2018 | Kidambi | H04L 67/327 |
| 2018/0048658 A1 | 2/2018 | Hittel et al. | |
| 2018/0189369 A1* | 7/2018 | Baek | G06F 16/219 |
| 2019/0014167 A1 | 1/2019 | Rao et al. | |
| 2019/0087432 A1* | 3/2019 | Sion | G06F 16/13 |
| 2019/0109857 A1* | 4/2019 | Caffary, Jr. | G06F 16/176 |
| 2020/0249808 A1 | 8/2020 | Rao et al. | |
| 2022/0083185 A1 | 3/2022 | Rao et al. | |
| 2022/0334696 A1 | 10/2022 | Hawa et al. | |
| 2023/0214099 A1 | 7/2023 | Rao et al. | |

OTHER PUBLICATIONS

Notice of Allowance for U.S. Appl. No. 15/906,845, dated Dec. 30, 2019, 3 pgs.

International Preliminary Report on Patentability (Ch. I) and Written Opinion for International Patent Application No. PCT/CA2018/050821, dated Jan. 16, 2020, 6 pgs.

International Preliminary Report on Patentability (Ch. I) and Written Opinion for International Patent Application No. PCT/CA2018/050825, dated Jan. 16, 2020, 5 pgs.

International Search Report and Written Opinion issued for PCT/CA2018/050825, dated Sep. 17, 2018, 7 pages.

International Search Report and Written Opinion issued for PCT/CA2018/050821, dated Oct. 10, 2018, 8 pages.

"Store and Share Files in the Cloud with Google Docs," Jan. 12, 2010, [retrieved on Sep. 10, 2018 from <<https://cloud.googleblog.com/2010/01/store-and-share-files-in-cloud-with.html>> 5 pages.

451 Research, Evolving the Collaborative Enterprise: How to Achieve Modernity and Security in the Digital Workspace Using Collaborative Systems, Pathfinder Report Commissioned by OpenText, Dec. 2016, 9 pages.

Walker, Enterprise File Sync and Share—It's Not What You Think, Digital Clarity Group Blog, Jan. 20, 2015, 6 pages.

Office Action issued for U.S. Appl. No. 16/854,536, dated Jan. 19, 2021, 19 pages.

European Search Report issued for European Patent Application No. 18828990.4, dated Mar. 24, 2021, 5 pages.

(56) References Cited

OTHER PUBLICATIONS

European Search Report issued for European Patent Application No. 18828646.2, dated Mar. 15, 2021, 7 pages.
Office Action issued for U.S. Appl. No. 17/537,783, dated Sep. 16, 2022, 10 pages.
Notice of Allowance issued for U.S. Appl. No. 17/537,783, dated Dec. 14, 2022, 6 pages.

* cited by examiner

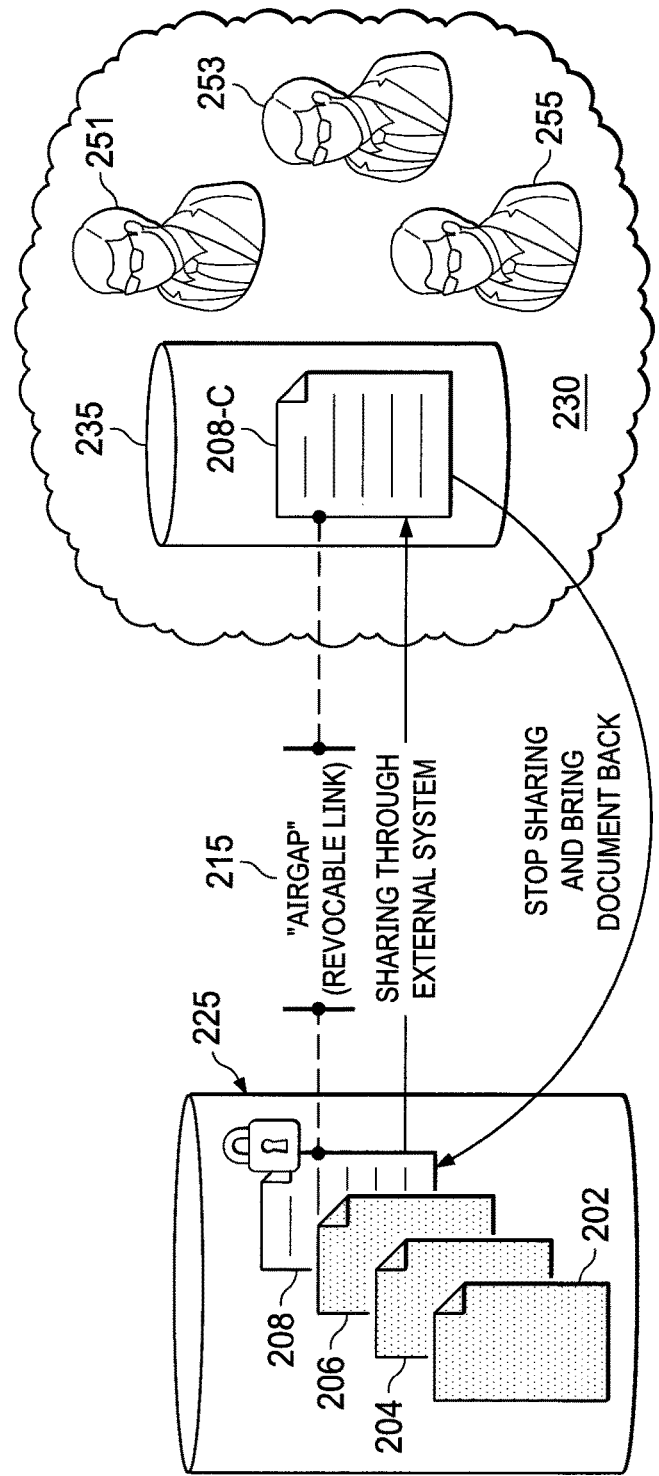
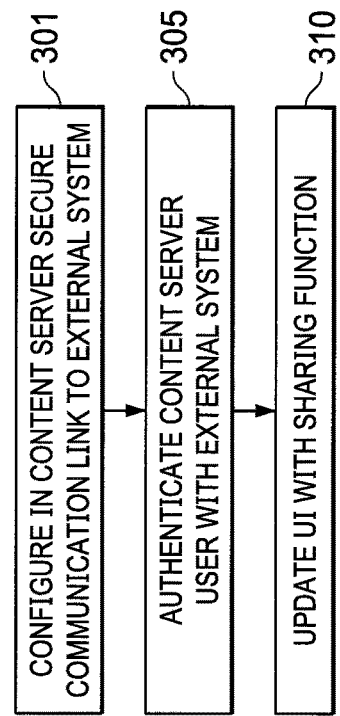

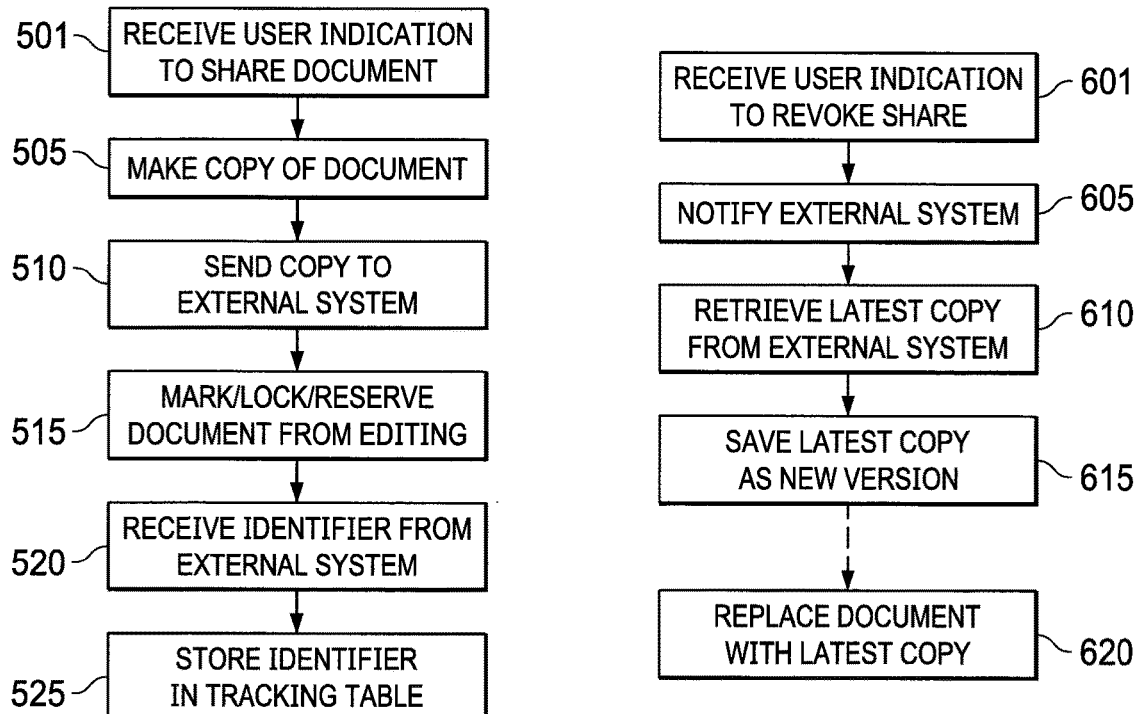

| Enterprise > Business Proposals > East Dam Project | | | | | | |
|---|---|---|---|---|---|---|
| 710 730 | | East Dam Project » | | | | |
| Copy link Share » Edit » View Permissions Download Reserve Copy Move Add version ••• | | | | | | |
| ☐ 3004WaterPump | Email Link ~712 | | | 822 KB | 11/09/2017 6:11:54 PM | ☆ |
| ☐ Construction-Sc... | Share externally ~714 | | | 57 KB | 11/09/2017 6:11:54 PM | ☆ |
| ☐ Project Staffing Policies.docx | | | | 12 KB | 11/16/2017 6:30:50 PM | ☆ |
| ☐ Garden Project Checklist.docx ~706 | | | | 23 KB | 11/09/2017 6:11:56 PM | ☆ |
| ☐ mercbmp.docx | | 716 | | 645 KB | 11/09/2017 6:11:56 PM | ☆ |
| ☑ Request-for-Proposal.docx ~701 | | | | 34 KB | 11/16/2017 2:42:46 PM | ☆ |
| ☐ RVS-DN-Spec-Guide-2011.docx | | | | 23 KB | 11/09/2017 6:11:55 PM | ☆ |
| ☐ SampleSchedule.pdf | | | | 510 KB | 11/09/2017 6:11:55 PM | ☆ |
| ☐ Yields.xlsx | | | | 11 KB | 11/09/2017 6:11:54 PM | ☆ |

9 items

| | | | | | |
|---|---|---|---|---|---|
| Enterprise > Business Proposals > East Dam Project | | | | | |
| ▽ + ⓘ Copy link Share Revoke share | 930 | 🗀 East Dam Project » View Permissions Download Copy Move | | 🗩 ☆ ↗ | |
| ☐ | | | | | |
| ☐ 📄 3004WaterPump.docx | | | 822 KB | 11/09/2017 6:11:54 PM | ☆ |
| ☐ 📄 Construction-Schedule-20161007.pdf | | | 57 KB | 11/09/2017 6:11:54 PM | ☆ |
| ☐ 📄 Project Staffing Policies.docx | 906 | | 12 KB | 11/16/2017 6:30:50 PM | ☆ |
| ☑ 📄 Garden Project Checklist.docx | | 916 🔒 | 23 KB | 11/09/2017 6:11:56 PM | ☆ |
| ☐ 📄 mercbmp.docx | | | 645 KB | 11/09/2017 6:11:56 PM | ☆ |
| ☐ 📄 Request-for-Proposal.docx | | | 34 KB | 11/16/2017 2:42:46 PM | ☆ |
| ☐ 📄 RVS-DN-Spec-Guide-2011.docx | | | 23 KB | 11/09/2017 6:11:55 PM | ☆ |
| ☐ 📄 SampleSchedule.pdf | | | 510 KB | 11/09/2017 6:11:55 PM | ☆ |
| ☐ 📄 Yields.xlsx | | | 11 KB | 11/09/2017 6:11:54 PM | ☆ |
| 9 items | | | | | |

SYSTEMS AND METHODS FOR CONTENT SHARING THROUGH EXTERNAL SYSTEMS

CROSS-REFERENCE TO RELATED APPLICATION(S)

This application claims a benefit of priority from U.S. Provisional Application No. 62/529,617, filed Jul. 7, 2017, entitled "SYSTEMS AND METHODS FOR CONTENT SHARING THROUGH EXTERNAL SYSTEMS," the entire disclosure of which is incorporated by reference herein.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to the field of enterprise information management (EIM). More particularly, this disclosure relates to EIM systems operating in networked computing environments. Even more particularly, this disclosure relates to sharing, through external systems that operate in a cloud computing environment, content or any information that is managed by a restricted storage system, repository, or an EIM system that operates in an enterprise computing environment.

BACKGROUND OF THE RELATED ART

Enterprise information management (EIM) is a particular technical field in Information Technology (IT). EIM combines many enterprise class systems such as enterprise content management (ECM), business process management (BPM), customer experience management (CEM), and business intelligence (BI). An EIM system may utilize a content server to, among other things, store, and manage an organization or enterprise's digital assets such as content and documents (which are collectively referred to herein as "managed objects"). To protect these managed objects, the content server would operate behind the enterprise's firewall and be particularly configured so that only authorized users may have secure access to the managed objects. Often, content servers are located on the premises (e.g., a server machine or machines on which a content server is implemented would be physically installed in a building) of the organization or enterprise. This is sometimes referred to as "on-prem."

As an enterprise continues to grow, so does the need for enterprise users to collaborate and/or share files with external users. Since external users are generally not authorized to access the enterprise's EIM system, they cannot view and/or edit any file managed by the enterprise's content server. When a need arises for an external user to review and/or edit a file, one common option is for an enterprise user to log into the enterprise content server from within the enterprise network where the content server resides, retrieve the file, and share a copy the file with an external user by email or through a cloud-based storage system that is open to the public.

Once that copy is shared outside of the enterprise network, it is no longer under management by the content server. The content server has no way of tracking the shared copy, getting the shared copy back to the content server, and/or updating the original file to reflect any changes made to the shared copy. Since this kind of "copy-and-set-free sharing" can pose a security risk, the sharing feature may be disabled in a content server to prevent sharing certain files, folders, directories, etc. However, this means that the need to share externally is not addressed. Embodiments disclosed herein can address this need and more.

SUMMARY OF THE DISCLOSURE

A goal of the invention is to improve EIM systems by providing a safe and secure way to expose content managed by an "on-prem" EIM system operating in an enterprise computing environment. This goal can be achieved in a content server running on a feature rich content server platform where content server users can safely and securely share and collaborate on EIM-managed content with external participants through an external system such as a cloud-based storage system. In this disclosure, the term "platform" broadly refers to a particular structure on which multiple software products (i.e., applications) can be built within the same technical framework. The structure, in this case, includes both hardware and software components.

OpenText™ Content Suite, which includes OpenText Content Server ("Content Server") and which is available from OpenText, headquartered in Canada, can be a non-limiting example of a feature rich content server platform on which some embodiments disclosed herein can be implemented. For the purpose of illustration, and not of limitation, OpenText Core ("Core") can be a non-limiting example of an external system (i.e., a system that is external to an EIM system or content server operating in an enterprise computing environment). Core operates in a cloud computing environment and provides personal cloud storage for securely sharing and collaborating on files. These files are stored by Core in the cloud computing environment (e.g., on a tenant server computer in a multitenancy platform operated by a cloud-hosting service provider such as OpenText Cloud) which is separate and independent from the enterprise computing environment. Skilled artisans appreciate that embodiments disclosed herein are not limited to Core and can work well with any external systems, including any third-party cloud storage system operating in a cloud computing environment external to an EIM system disclosed herein operating in an enterprise computing environment behind a firewall thereof.

In some embodiments, sharing content managed by a content server through an external system can be achieved by the content server in several ways, for example:
  sharing through a public link;
  sharing through an email invite; or
  sharing through shared workspaces.

In some embodiments, to share a managed object (e.g., a document or folder), an enterprise user, who is referred to herein as an "originator," first logs into a content server if he's not already logged in. The originator can navigate to the managed object, which is stored in a repository managed by the content server, through a user interface provided by the content server. The originator can indicate (e.g., through actuation of a user interface element such as a box or button associated with the managed object) to the content server that the managed object is to be shared.

In some embodiments, the content server is configured for communicating with an external system over a network (e.g., through a public application programming interface (API) provided by the external system). Responsive to the originator's instruction to share the managed object, the content server is operable to make a copy of the managed object, send the managed object to the external system, and lock the managed object stored in the repository (e.g., by marking it as "read-only.").

In response to receiving the copy of the managed object, the external system may operate to generate a unique identifier and a publicly accessible universal resource locator (URL) and return the unique identifier and the URL to the content server. The URL generated by the external system indicates a network address where the copy of the managed object resides in a storage location in the external system.

In turn, the content server is operable to display or otherwise provide the URL generated by the external system to the originator through its user interface and store the unique identifier in a table. The content server is operable to utilize multiple tables to keep track of managed objects shared through external systems.

The originator can copy the URL to a clipboard and paste it into an email or another document (or emails or documents) for the external user and/or other user(s). The control and management of the managed object thus shared can depend on what the originator had specified at the time the sharing is originated.

For example, if the managed object is shared for read-only purposes, no modification will be made to the read-only copy and thus the content server will not need to track the read-only copy. The content server can, however, keep track of how, when, and/or by whom the managed object is shared. To facilitate tracking, an audit log or file can be created and maintained by the content server accordingly.

As another example, if it is possible that the shared copy of the managed object has been modified (e.g., by an external user who is authorized or otherwise allowed to edit the shared copy), when that sharing is revoked (e.g., either manually by the originator or automatically upon the expiry of the date and/or time specified in the share profile), the content server is operable to retrieve the shared copy from the external system and replace the managed object with the copy retrieved from the external system. The content server notifies the external system that the copy is no longer shared. In response, the external system deletes the copy from the storage location in the external system and notifies its user(s) that the copy is no longer shared.

In some embodiments, an originator can share a managed object via an email invite from within a content server user interface (also referred to herein as a "smart UI") provided by a content server. The content server UI provides a set of tools, including one that allows the originator to identify participants (internal content server users and/or external users) using their email addresses or email identifiers. For example, responsive to an indication or instruction from the originator to share the managed object, the content server is operable to generate a dialog or popup window with input fields for the originator to specify a share profile containing sharing specifics such as an email address of a user (e.g., a viewer or collaborator who has no access to the content server), a role of the user (e.g., a viewer with view-only privilege or a collaborator/contributor with edit privilege), an expiry date and/or time to revoke the share (which is specific to the particular managed object), a password, an activity count (which limits, for instance, the number of times the managed object can be accessed through a public link before the link is disabled), and so on. The originator can then indicate to the content server to save the share profile and/or share the managed object with the user.

In response, the content server is operable to send a public link or a copy of the managed object to the email address of the external user and mark the managed object, for instance, as locked or "air-gapped." In this disclosure, "air-gapped" means that the managed object now has a special tag and that any modification (e.g., changes, additions, etc.) to the managed object (i.e., the original version that is still under the direct management of the content server) is not allowed. Rather, the participants (including the originator, any internal content server users, and any external users who had been identified and assigned particular roles by the originator) would collaborate on the copy that is now shared among the participants.

The content server UI of the content server thus allows content server users to share managed content directly through the content server and eliminates the need for content server users to copy and paste an URL (which is generated by an external system) into an email or document using a separate application (e.g., an email application or a document editor) and then send that email or document.

In some embodiments, the external system is operable to notify (and register when necessary) participants in the collaboration about the shared copy and also notify when new versions are added (e.g., when a participant modifies the shared copy, a new version is created by the external system) or whenever something changes in the share. The operation of the external system in this regard is outside of the scope of this disclosure and thus is not further described herein.

In this disclosure, an "airgap" is used to refer to a relatively weak and revocable (and hence loosely coupled) link between the original version in the content server and the shared version in the external system. The original version and the shared version physically reside in completely separate systems. However, they are in a shared state through this link which is maintained and tracked (e.g., in a suitable data structure) by the content server. In this way, the originator can easily revoke the share and return the shared version back to the content server (e.g., when the collaboration has ended, or whenever sharing is stopped for any reason). An instruction to stop sharing would cause the content server to retrieve the last version from the external system and add it as a new version on the content server or replace the original version. The content server can then update the tracking table to remove the link since the managed object is no longer shared through the external system.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 2 depicts a diagrammatical representation of a data flow when repository content managed by a content server in an enterprise computing environment is shared through an external system and retrievable by the content server through a revocable link according to some embodiments disclosed herein.

FIG. 3 is a flow chart illustrating a method of setting up a content server for external sharing according to some embodiments disclosed herein.

FIG. 4 depicts a diagrammatical representation of an administrative user interface of a content server for configuring a secure communication link to an external system according to some embodiments disclosed herein.

FIG. 5 is a flow chart illustrating an example of a method for sharing repository content managed by a content server in an enterprise computing environment through an external system according to some embodiments disclosed herein.

FIG. 6 is a flow chart illustrating an example of a method for stop sharing repository content managed by a content server in an enterprise computing environment through an external system according to some embodiments disclosed herein.

FIGS. 7A-7C depict diagrammatical representations of exemplary views of a content server user interface of a content server with an external sharing function according to some embodiments disclosed herein.

FIGS. 9A-9B depict diagrammatical representations of exemplary views of a smart user interface of a content server with a revoke share function according to some embodiments disclosed herein.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

A goal of this disclosure is to provide a feature-rich content server platform operating in an enterprise computing environment where content server users can safely and securely share and collaborate on repository content (e.g., documents) managed by a content server with external participants through an external system such as OpenText Core. Sharing to external participants should not burden internal content server users with having to learn how to navigate and use the external system. For security reasons, interactions between content server users and the external system should be kept to a minimum. Instead, content server administrators should control who has access to sharing privileges. Preferably, there should be a minimum impact on the content server functionality on shared documents.

In some embodiments, this and other goals can be realized in a content server enhanced with several components to provide a new external sharing function to content server users. As an example, new and/or updated content server components can include a sharing module, a tracking mechanism, and an enhanced user interface (UI).

Figure 1:
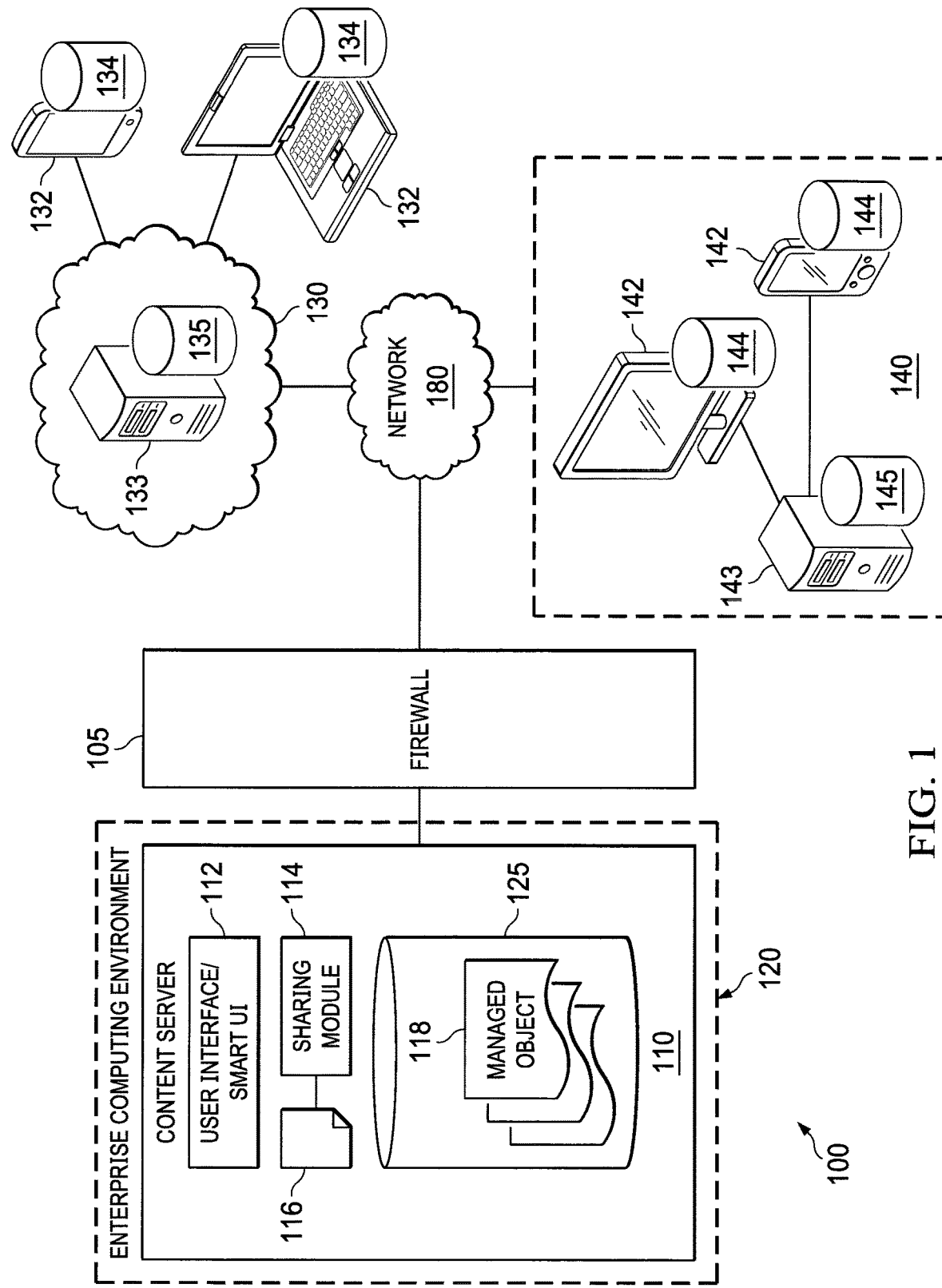
FIG. 1 depicts a diagrammatical representation of sharing repository content managed by a content server in an enterprise computing environment through external systems according to some embodiments disclosed herein.

FIG. 1 depicts a diagrammatical representation of system 100 for sharing content (e.g., managed objects 118) stored in a repository (e.g., repository 125) managed by a content server (e.g., content server 110) in an enterprise computing environment (e.g., enterprise computing environment 120) through external systems (e.g., external systems 130, 140) through the enterprise's firewall (e.g., firewall 105) over a network (e.g., network 180) according to some embodiments disclosed herein. In the example of FIG. 1, content server 110 further comprises a sharing module (e.g., sharing module 114), a tracking mechanism (e.g., tracking database 116), and an enhanced UI (e.g., UI or smart UI 112). The operations and functionalities of these content server components are further described below.

Skilled artisans appreciate that a content server can be located "on-prem" in an enterprise computing environment or hosted in a cloud computing environment. Accordingly, FIG. 1 is meant to be exemplary and non-limiting.

Likewise, a system external to the content server can be an on-prem external system or a cloud-hosted external system. In the example of FIG. 1, external system 130 represents a cloud-hosted external system and external system 140 represents an on-prem external system. External system 130 can have server machine(s) 133 with storage(s) 135 accessible by user devices 132, each of which having non-transitory computer readable-medium 134. External system 140 can have server machine(s) 143 with storage(s) 145 accessible by user devices 142, each of which having non-transitory computer readable-medium 144.

As discussed above, in some cases, an enterprise user may need to collaborate and/or share files with external users. For example, a content server user "Engineer" may try to create a design specification for a new pump that will be delivered to a customer. The pump specification document is stored in the content server. However, Engineer needs some input from external contractors who will be supplying parts to the pump. Those contractors do not have access to Engineer's document in the content server, but Engineer needs them to be able to edit and make changes to the pump specification document. In this case, Engineer could make a copy of the pump specification document and either upload the copy to an external system accessible by the contractors or email the pump specification document to the contractors.

Either way, once the pump specification document is shared outside of the enterprise network, it is no longer under management by the content server and each of the contractors (external users) could freely view, modify, copy, store (e.g., in hosted or local storage), and even share it with other external users. The content server had no way of tracking the shared copy, getting the shared copy back to the content server, and/or updating the original file to reflect any changes made to the shared copy.

This kind of "copy-and-set-free sharing" can pose a security risk. Therefore, the sharing feature is usually disabled in a content server to prevent sharing certain files, folders, directories, etc.

In some embodiments, access to sharing features provided by content server 110 is turned off by default. However, an administrator can enable sharing and assign sharing privileges to content server users through an administrator UI. Following the above example, the sharing privilege would allow Engineer to share the pump specification document stored in the content server with the contractors through a designated external system. Once shared, the pump specification document stored in the content server is locked to prevent changes/additions. The contractors can edit the copy stored on the external system. When the contractors have made their inputs to the copy stored on the external system, Engineer can bring the edited copy back to the content server. This process is further explained below with reference to FIG. 2.

FIG. 2 depicts a diagrammatical representation of a data flow when repository content managed by a content server in an enterprise computing environment is shared through an external system and retrievable by the content server through a revocable link according to some embodiments disclosed herein. In this example, repository 225 stored managed objects (e.g., documents 202, 204, 206, 208).

In some embodiments, using a content server UI, a user (referred to herein as the "originator") can select a document (e.g., document 208) stored in repository 225 and chooses to share the document through external system 230. The originator can identify participants (e.g., external users 251, 253, 255 of external system 230) using their email addresses (or email identifiers).

As will be explained below, in some embodiments, the content server is configured with a secure communication link to the external system. This allows the content server to provide a type-ahead style participant look-up function to identify external users who are already registered with the external system. In some embodiments, the external system may notify all participants and handle registration of new users.

In some cases, participants can also include internal users of the content server. The originator assigns a role for each participant, either as a contributor or a viewer. Further, while a document is used as an example here, the originator can choose to share a folder.

In the example of FIG. 2, a copy (e.g., document 208-C) of the document (e.g., document 208) selected by the originator (through a UI element on the content server UI) for external sharing is made and sent to the external system (e.g., external system 230). The external system stores the copy in its local storage (e.g., repository 235) and notifies the participants that the originator has shared the copy with them.

In some embodiments, the external system may return to the content server a unique identifier generated by the external system to identify the copy internally. The content server is operable to store this unique identifier from the external system along with its document identifier for the original document in a tracking table or database (e.g., tracking store 116). The original document stored in the repository managed by the content server and the copy stored on the external system (also referred to as a "document share") is linked through this relatively weak and revocable link (e.g., link 215) referred to as an airgap.

The original document (e.g., document 208) is marked and tagged, for instance, as "shared for collaboration" in the content server's repository (e.g., repository 225). This tag can help identify and track documents that have been shared. In some embodiments, audit logs can be created with share-related information. The content server UI is updated to reflect or otherwise indicate that the document (or folder) is shared externally.

The external system may also notify all participants when a new document version has been added (by any of the participants). Further, the external system may notify all participants when something changes in the document share.

The originator can choose to "unshare" the document share through the content server UI. In some embodiments, unsharing a file share may cause the content server to retrieve the last version from the external system and add it as a new version in the repository managed by the content server. In turn, the external system sends notifications to all participants that the file share has been revoked and removes the file share from its storage.

As discussed above, the content server can communicate with the external system through a secure communication link or path. FIG. 3 is a flow chart illustrating a method of setting up a content server for external sharing through a secure communication link or path to an external system. Previously, it was very difficult to enable and manage external sharing from an ECM system or content server. This is because enterprise file synchronization and sharing (EFSS) is a highly complex functionality and requires complicated integration between the content server (inside of an enterprise) and endpoint systems (outside of the enterprise) and lengthy user setups for all involved. In this case, in some embodiments, only a one-time configuration is needed by an administrator of the content server. This allows for easy and fast integration and user setups. Further, by leveraging existing external systems, users of those systems do not need to learn how to interact with the content server in order to access content managed by the content server.

In some embodiments, an administrator of the content server can access an administrator UI (e.g., FIG. 4) to select an instance of a cloud-hosted external system (e.g., Core), depending upon where that instance (tenant) is hosted (e.g., on North American servers). The administrator can configure the content server with the client identifier (Client ID) and client credential provided by the external system (301). These are needed for authentication (e.g., through OAuth authentication). When sharing, a content server user has to authenticate with the external system (305). In some embodiments, authentication can be done using an OAuth2 Authorization Grant flow. The external system's access and refresh tokens may be maintained in the content server. This can minimize the frequency by which the content server would need to re-authenticate with the external system. In some embodiments, the external system may support Active Directory Synchronization and Single Sign On authentication methods. Other authentication methods may also be possible. The content server UI is then updated to enable the external sharing function provided by the sharing module (310). At this point, the content server user can navigate to a document or folder in the repository and share it through the external system.

FIG. 5 is a flow chart illustrating an example of a method for sharing repository content managed by a content server in an enterprise computing environment through an external system according to some embodiments disclosed herein. In some embodiments, the content server is operable to receive, through the content server UI, an indication or instruction from a content server user to share an item (e.g., a file or folder) in the repository (501). In this case, the content server user has an edit permission on the item to add participants (e.g., in various roles such as collaborators, viewers, etc.). In response, the content server is operable to make a copy ("share") of the item (505), send the share to the external system (510), establish a link between the original and the share, and mark, lock, reserve, or otherwise preserve the original in the repository so that it cannot be modified, changed, or edited in any way (515).

In some embodiments, a link between the original and the share can be established as follows. The external system may receive the share, assign a unique identifier for internal use, store the share locally using the unique identifier, and send the unique identifier to the content server. The content server is operable to receive the unique identifier and other information (see below examples of various types of data points collected) from the external system (520) and store it in a tracking table, database, store, or any suitable data structure maintained by the content server (525). In some embodiments, the content server is operable to update the content server UI to indicate (e.g., by placing an icon next to the file or folder in the content server UI) that the original item in the repository is now shared and is locked and cannot be edited. That is, changes/additions to the version in the content server will not be allowed after it has been shared externally. Instead, all share participants (internal and external) will collaborate on the share that now resides on the external system.

It should be noted here that, while the method above describes sharing repository content managed by a content server in an enterprise computing environment externally with external participants who do not have access to the content server, sharing repository content with internal users will also work seamlessly. That is, users internal to the enterprise computing environment can share documents with internal users who are also a member of the external system. The content server UI may be further enhanced for internal users so that they have minimal interaction with the external system. For example, in some embodiments, content server users who have special privileges (e.g., a "Collaborator" privilege) on a shared document may edit the shared document directly from the content server (e.g., using Office Editor) without having to use the external system. Changes made to the shared document using Office Editor can be immediately added to the version of the shared document in the external system.

In some embodiments, the content server UI includes a shared content widget that provides users who share content with easy access to view all the content they have shared. Through the same widget, users can also view content that has been shared to them. In some embodiments, the shared content widget can be implemented as a menu item, a popup window, or a section or tile on a user home page. Other implementations are also possible.

An aspect of this invention is to utilize an external system as an extension of a content server that resides in an enterprise computing environment and operates behind a firewall. This extension allows sharing from the content server and using the external system as a secure, user-friendly collaboration platform to provide external participants access to shared documents. For example, in a cloud-hosted external system such as Core, participants (internal as well as external) can readily access Core and collaborate on a document through Core, using Core's web client, mobile client, and desktop client apps running on disparate user devices. In some embodiments, files that are shared from the content server to the external system may be placed in the external system's user storage under a special folder name "My Content Server Shared Items." Other storage scenarios may also be possible.

To ensure security, in some embodiments, communications between the content server and the external system may utilize the Representational State Transfer (REST) protocol. In some embodiments, the content server is operable to utilize the external system's REST layer as the application programming interface (API) of choice for server-to-server interactions such as user lookup, share initiation, share revoke, etc. In some embodiments, the content server is operable to make all the outbound calls (e.g., REST API calls) to the external system. In some embodiments, no inbound connection from the external system back into the content server may be required. In some embodiments, the external system never reaches into the content server. In some embodiments, sharing scenarios from the content server may be manually driven by end users. In some embodiments, sharing scenarios from the content server may be performed programmatically and automatically through a rules-based engine.

In some embodiments, the steps described above can be performed by a sharing module of the content server. As a non-limiting example, the sharing module is operable to utilize a table, such as Table 1 below, to keep track of information (e.g., OAuth2 tokens, identifiers, etc.) that allow the content server to perform actions on behalf of its users. The sharing module is also operable to use the table to determine when a user is to be prompted for authentication.

TABLE 1

| Name | Type | Size | Null Status | Description |
| --- | --- | --- | --- | --- |
| UserID | Number | 19 | Not Null | The user identifier of the content server user to whom this authentication information belongs. |
| Provider-Name | VarChar | 255 | Not Null | The name of the external system that issued the authentication information. |
| Provider-UserID | VarChar | 255 | Not Null | The user's user identifier on the external system. |
| Access-Token | VarChar | | Null | The OAuth2 access token that was issued by the external system. |
| Refresh-Token | VarChar | | Null | The OAuth2 refresh token that was issued by the external system. |
| Expiry-Time | Number | 19 | Not Null | The time the AccessToken expires (in seconds). |
| Token-Type | VarChar | 255 | Null | The type of authentication token that was issued. |

As another non-limiting example, in some embodiments, the sharing module of the content server is additionally operable to track, or utilize a different table, such as Table 2 below, to keep track of all the documents that have been shared externally to an external system (e.g., OpenText Core).

TABLE 2

| Name | Type | Size | Null Status | Description |
|---|---|---|---|---|
| DataID | Number | 19 | Not Null | The identifier of the content server item that is being shared. |
| ProviderItemID | VarChar | 255 | Not Null | The identifier of the item in the external system. |
| ProviderVersionID | VarChar | 255 | Not Null | The version identifier of the item in the external system. |
| SharedVersion | Number | 19 | Not Null | The version number of the content server that is being shared. |
| SharedVersionID | Number | 19 | Not Null | The version identifier of the content server item that is being shared. |
| SharedBy | Number | 19 | Not Null | The user identifier of the content server user that shared the item. |
| SharedOn | Date |  | Not Null | The date the content server item was shared. |

As discussed above, when a file (or folder) is shared from the repository to an external system, a link is established between the original file in the repository and the copy in the external system. The external sharing can be revoked (e.g., by the originator) at any time, severing the link between the original file in the repository and the copy in the external system. When this occurs, the latest version of the copy is retrieved from the external system (e.g., by the sharing module of the content server) and, in some embodiments, saved as a new version in the repository or used to replace the original version. An example of a process triggered by sharing revocation is described below.

FIG. 6 is a flow chart illustrating an example of a method for stop sharing repository content managed by a content server in an enterprise computing environment through an external system. In some embodiments, an originator (e.g., a content server or enterprise user who initially shared a file or folder (also referred to as a "share") in the content server with external user(s) through an external system) may navigate to a shared file or folder through a content server UI and instruct the content server to stop sharing the file or folder. The content server is operable to receive the user indication through the content server UI (601) and take appropriate actions to stop sharing the file or folder (and hence revoking the previously established link between the original in the repository and the share in the external system). These actions include, in some embodiments, notifying the external system that the share privilege (as a viewer or collaborator) granted to a participant (i.e., a user of the external system) on a share has been revoked (605), retrieving the latest version of the share from the external system (610), and saving the retrieved version as a new version in the repository (615). Alternatively or additionally, the content server is also operable to replace the original in the repository with the retrieved version (620). In response to the notification from the content server, the external system is operable to delete the share and notify the participants of the share that the share is no longer accessible through the external system.

Figure 7B:
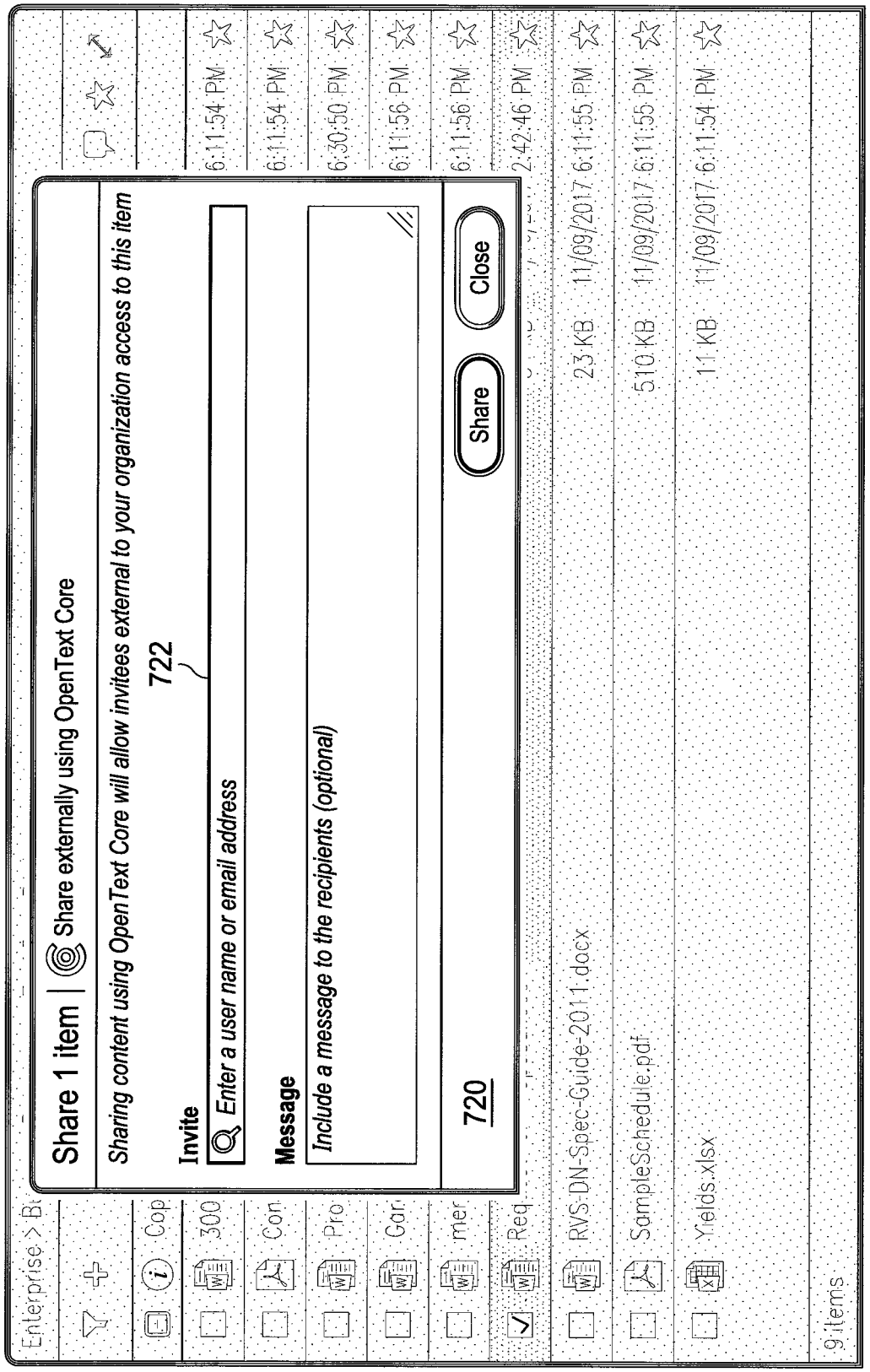
Figure 7C:
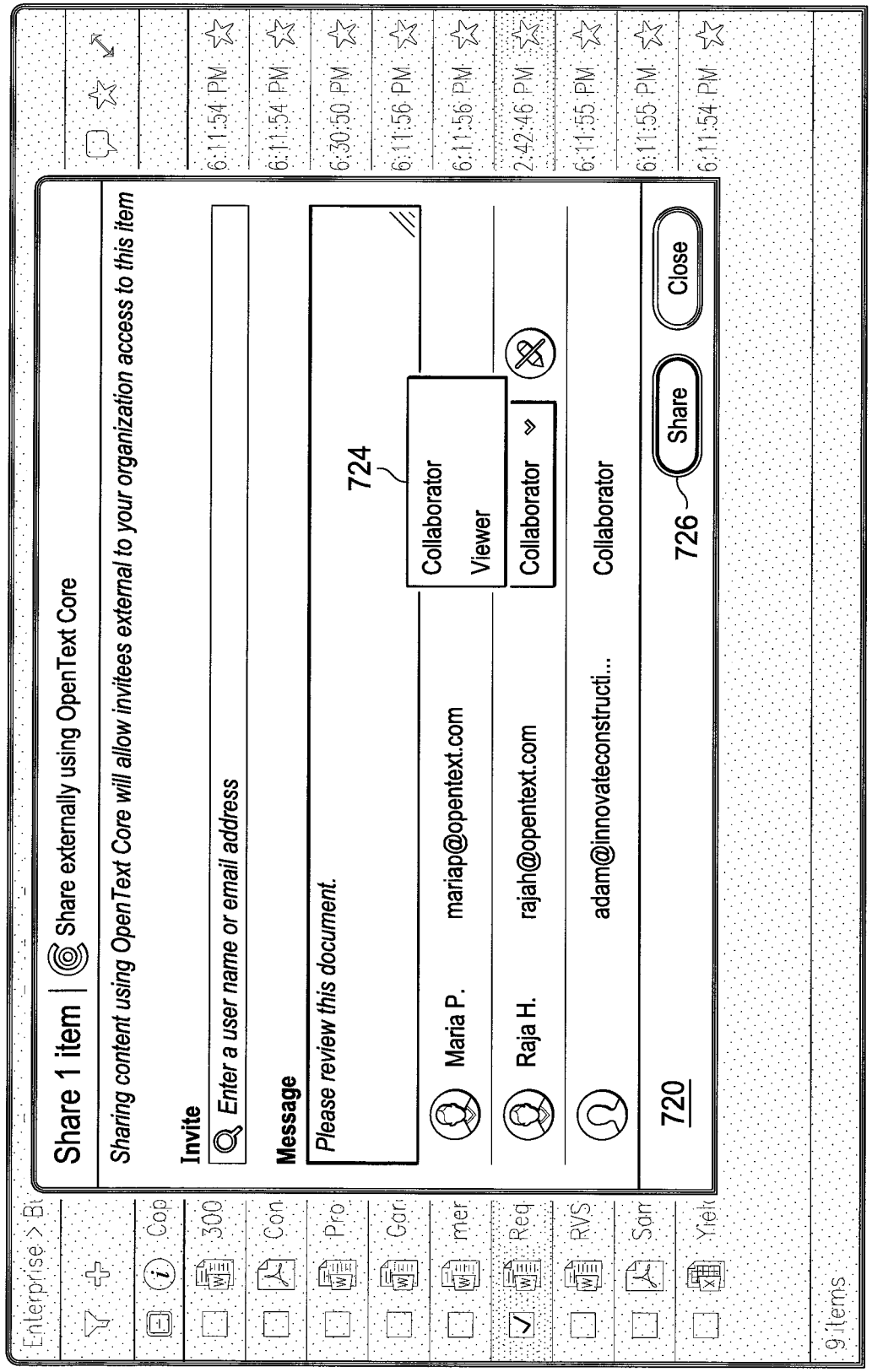

FIGS. 7A-7C depict diagrammatical representations of exemplary views of UI 700 of a content server with external sharing function 710 according to some embodiments disclosed herein. In the example of FIG. 7A, external sharing function 710 provides different sharing solutions 712, 714 for a content server user to share repository content managed by the content server, for instance, by emailing a link (712) or through an external system (714). In FIG. 7A, the content server user has selected file 701 for sharing. Since file 701 has not been shared before, it can be edited using edit function 730. In the example of FIG. 7A, file 706 had been shared and is shown with icon 716 indicating that file 706 is locked or reserved and no editing is allowed.

Upon receiving an indication from the content server user (e.g., when external sharing 714 is selected), in some embodiments, the sharing module of the content server is operable to generate popup window or dialog box 720 with input fields (e.g., invite input field 722) for the content server user to specify or identify participant(s) (external and/or internal user(s)) with whom file 706 is to be shared (FIG. 7B). In some embodiments, a participant can be identified using an email address or email identifier (ID). In some embodiments, the content server is operable to communicate with the external system and provide type-ahead participant look-up as the originator types in a participant's information. As FIG. 7C illustrates, a participant can be an internal user or an external user and the originator can, using role assignment function 724 provided by the content server UI, assign a role ("Collaborator" or "Viewer") to each participant. Optionally, messages can be added to the invite email. Skilled artisans appreciate that, alternatively or additionally, other types of roles may also be utilized (e.g., "Contributor", "Reviewer," "Contractor," "Commentator," "editor," etc.). The originator can then indicate (e.g., by clicking or selecting "Share" button 726) to the content server that file 706 is ready for sharing with the identified participant(s). The originator can later add or remove a participant directly using the content server UI.

On selection of "Share" button 726, the content server makes a copy of file 706 and calls the external system. As discussed above, the external system is operable to notify all the participants identified by the originator through content server UI 700 and handle registration of any new user. The external system is also operable to notify all the participants when a new version of the copy is added to the external system (e.g., by one of the participants) or when something changes in the share.

Figure 8A:
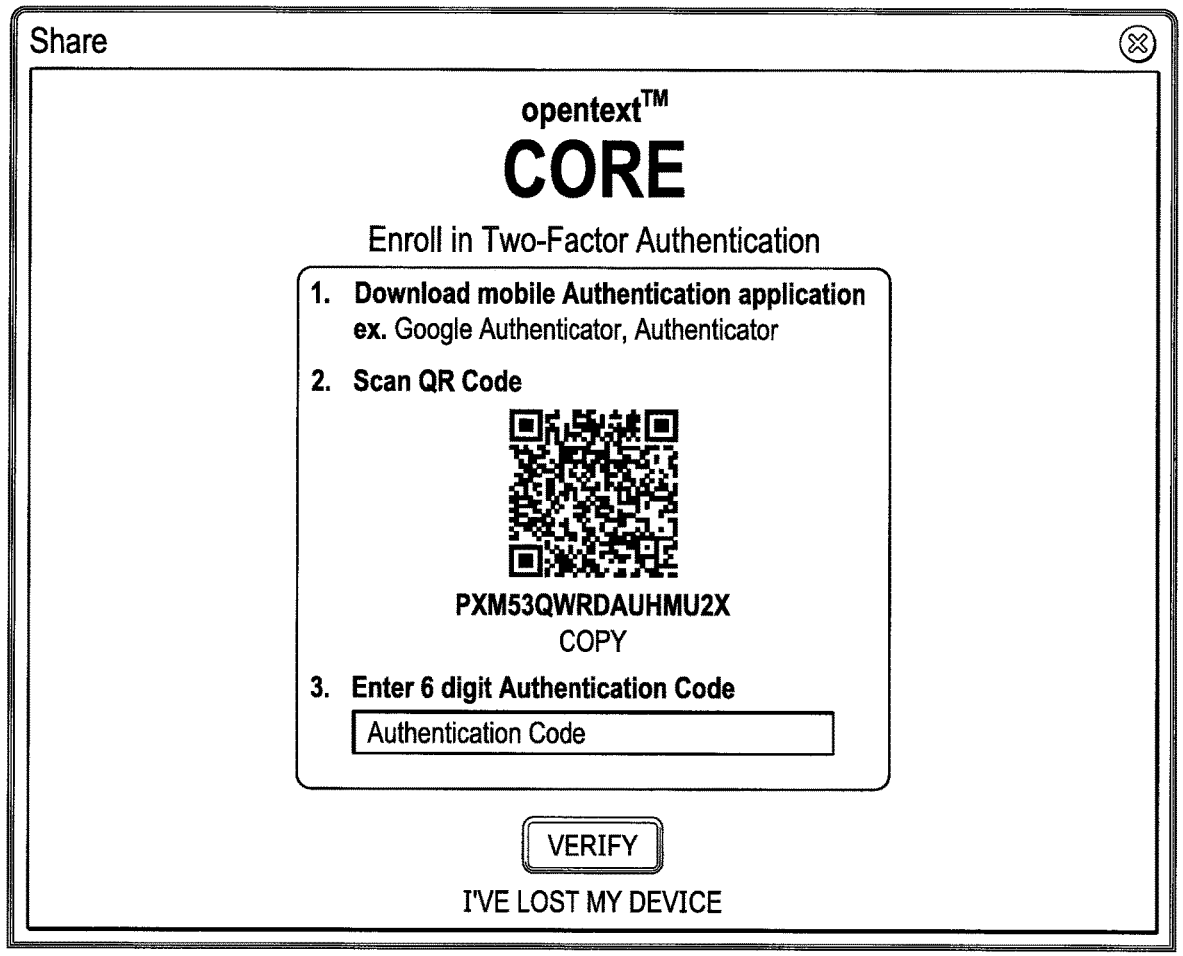
FIGS. 8A-8B depict diagrammatical representations of exemplary external system authentication pages according to some embodiments disclosed herein.
Figure 8B:
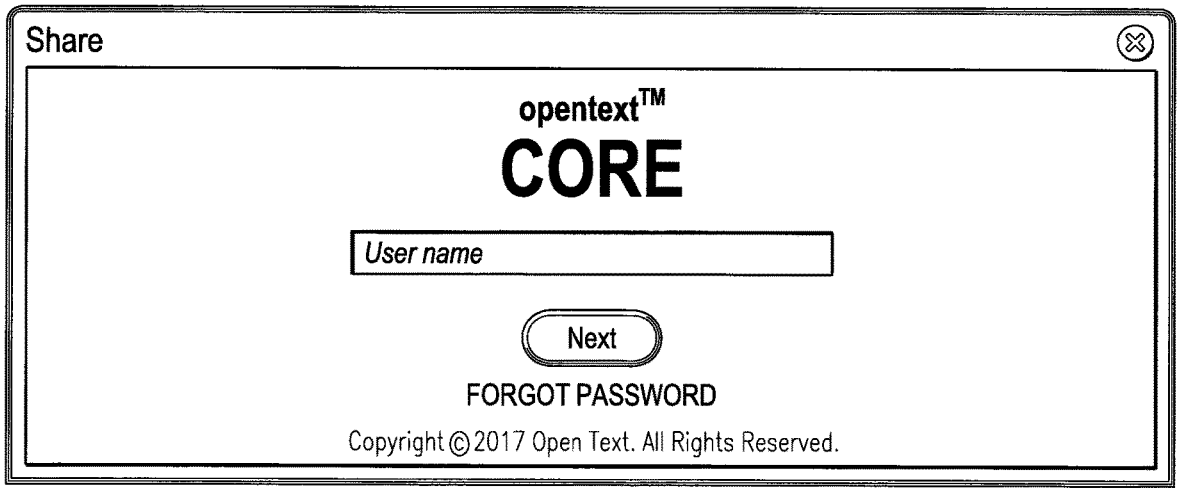

Content server users wishing to share repository content from the content server should have a user account on the external system as well. In some embodiments, a content server user can authenticate to the external system using various authentication configurations of the external system supported by the content server. FIGS. 8A-8B depict diagrammatical representations of exemplary external system authentication pages according to some embodiments disclosed herein. FIG. 8A shows an example of a two-factor authentication page and FIG. 8B shows an example of a standard username and password authentication page.

Figure 9B:
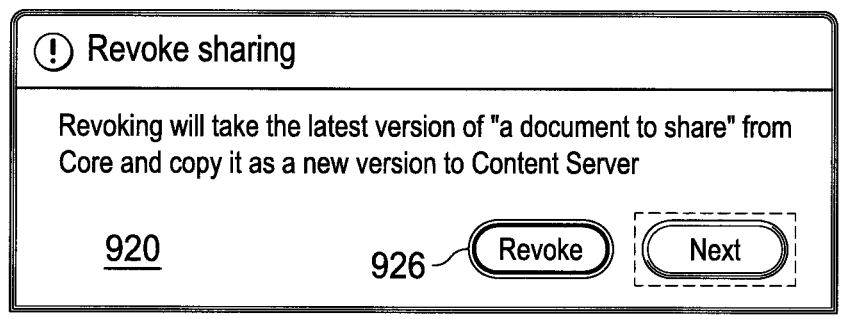

In some embodiments, shared files and folder are tagged with a special tag by the content server. Visually, this tag can be represented by an icon on the content server UI. This tag can be used by the content server to prevent access to a shared file or folder, as well as configuring the content server UI in real time with respect to each file or folder in the repository, for instance, to include an edit function if a file has not been shared or to include a revoke share function if a file is currently shared through an external system. As non-limiting examples, FIGS. 9A-9B depict diagrammatical representations of exemplary views of a user interface of a content server with a revoke share function according to some embodiments disclosed herein.

As illustrated in FIG. 9A, file 906 is currently locked from editing, as indicated by icon 916 in content server smart UI 900. Accordingly, when file 906 is selected, the content server is operable to dynamically change content server smart UI 900 to provide revoke share 930 for file 906 instead of an edit function. Upon user selection or actuation of revoke share 930 for file 906, the content server is operable to generate and present popup window or dialog box 920 prompting the user to confirm the instruction to revoke sharing file 906. The user may confirm by selecting or clicking "Revoke" button 926. In response, the content server is operable to notify the external system that file 906 is no longer shared. As discussed above, the content server is operable to retrieve the latest version of file 906 from the external system (also referred to as "repatriation") and store the latest version of file 906 in the repository as a new version of file 906. The content server is operable to update its tracking table(s) to remove entries associated with file 906 as it is no longer shared externally.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method for content sharing through external systems, comprising:

receiving, by a content server on a server machine in a first computing environment through a user interface (UI) of the content server, an indication from a user of the content server to share an item with a user of an external system, the item stored in a repository managed by the content server in the first computing environment, the external system operating on a server machine in a second computing environment that is different from and external to the first computing environment;

responsive to the indication from the user of the content server in the first computing environment to share the item with the user of the external system in the second computing environment, making, by the content server in the first computing environment, a copy of the item;

sending, by the content server in the first computing environment to the external system in the second computing environment, information identifying the user of the external system and the copy of the item such that the item and the copy of the system physically reside in separate systems;

establishing, by the content server in the first computing environment, a link between the item in the repository managed by the content server in the first computing environment and the copy of the item in the external system in the second computing environment, the establishing including associating the item in the repository in the first computing environment and the copy of the item in the external system in the second computing environment such that they are in a shared state through the link which is maintained and tracked through a tracking data structure maintained by the content server in the first computing environment, wherein the link established and maintained by the content server is revocable by the content server in the first computing environment;

locking, by the content server in the first computing environment, the item in the repository to prevent editing of the item in the repository managed by the content server in the first computing environment;

updating, by the content server in the first computing environment, the UI of the content server to indicate that the item in the repository is now shared and locked from editing via the UI of the content server in the first computing environment;

receiving an indication from the user of the content server to stop sharing the item with the user of the external system;

revoking the link between the item in the repository and the copy of the item in the external system, the revoking comprising deleting, from a tracking data structure maintained by the content server, information associated with a unique identifier for the copy of the item, the unique identifier received from the external system when the link was established;
notifying the external system that the item is no longer shared with the user of the external system; and
updating the UI to indicate that the item in the repository is no longer shared and is now editable.

2. The method according to claim 1, wherein the establishing further comprises receiving a unique identifier for the copy of the item from the external system and storing, in the tracking data structure, the unique identifier for the copy of the item and a unique identifier for the item with a user identifier for the user of the content server.

3. The method according to claim 2, wherein the tracking data structure comprises a field for storing the unique identifier for the item in the content server, a field for storing the unique identifier for the copy of the item in the external system, a field for storing a version identifier of the item in the external system, a field for storing a version identifier of the item in the content server, and a field for storing the user identifier for the user of the content server.

4. The method according to claim 1, wherein the item comprises a file or a folder.

5. The method according to claim 1, further comprising: as the item in the repository is shared and locked from editing, dynamically changing the UI of the content server to provide a revoke share function for revoking the link between the item in the repository and the copy of the item in the external system.

6. The method according to claim 1, further comprising:
retrieving a modified version of the copy of the item from the external system; and
saving the modified version of the copy of the item as a new version of the item in the repository.

7. The method according to claim 6, further comprising:
replacing the item in the repository with the modified version of the copy of the item retrieved from the external system.

8. A system for content sharing through external systems, comprising:
a processor;
a non-transitory computer-readable medium; and
stored instructions translatable by the processor for:
receiving, by a content server on a server machine in a first computing environment through a user interface (UI) of the content server, an indication from a user of the content server to share an item with a user of an external system, the item stored in a repository managed by the content server in the first computing environment, the external system operating on a server machine in a second environment that is different from and external to the first computing environment;
responsive to the indication from the user of the content server in the first computing environment to share the item with the user of the external system in the second computing environment, making a copy of the item in the first computing environment;
sending, from the first computing environment to the second computing environment, information identifying the user of the external system and the copy of the item to the external system in the second computing environment such that the item and the copy of the system physically reside in separate systems;
establishing a link between the item in the repository in the first computing environment and the copy of the item in the external system in the second computing environment, the establishing including associating the item in the repository managed by the content server in the first computing environment and the copy of the item in the external system in the second computing environment such that they are in a shared state through the link which is maintained and tracked through a tracking data structure maintained by the content server in the first computing environment, wherein the link established and maintained by the content server is revocable by the content server in the first computing environment;
locking the item in the repository to prevent editing of the item in the repository managed by the content server in the first computing environment;
updating the UI of the content server to indicate that the item in the repository is now shared and locked from editing via the UI of the content server in the first computing environment;
receiving an indication from the user of the content server to stop sharing the item with the user of the external system;
revoking the link between the item in the repository and the copy of the item in the external system, the revoking comprising deleting, from a tracking data structure maintained by the content server, information associated with a unique identifier for the copy of the item, the unique identifier received from the external system when the link was established;
notifying the external system that the item is no longer shared with the user of the external system; and
updating the UI to indicate that the item in the repository is no longer shared and is now editable.

9. The system of claim 8, wherein the establishing further comprises receiving a unique identifier for the copy of the item from the external system and storing, in the tracking data structure, the unique identifier for the copy of the item and a unique identifier for the item with a user identifier for the user of the content server.

10. The system of claim 9, wherein the tracking data structure comprises a field for storing the unique identifier for the item in the content server, a field for storing the unique identifier for the copy of the item in the external system, a field for storing a version identifier of the item in the external system, a field for storing a version identifier of the item in the content server, and a field for storing the user identifier for the user of the content server.

11. The system of claim 8, wherein the item comprises a file or a folder.

12. The system of claim 8, wherein the stored instructions are further translatable by the processor for:
as the item in the repository is shared and locked from editing, dynamically changing the UI of the content server to provide a revoke share function for revoking the link between the item in the repository and the copy of the item in the external system.

13. The system of claim 8, wherein the stored instructions are further translatable by the processor for:
retrieving a modified version of the copy of the item from the external system; and
saving the modified version of the copy of the item as a new version of the item in the repository.

14. The system of claim 13, wherein the stored instructions are further translatable by the processor for:
replacing the item in the repository with the modified version of the copy of the item retrieved from the external system.

15. A computer program product for content sharing through external systems, the computer program product comprising a non-transitory computer-readable medium storing instructions translatable by a processor for:

receiving, by a content server on a server machine in a first computing environment through a user interface (UI) of the content server, an indication from a user of the content server to share an item with a user of an external system, the item stored in a repository managed by the content server in the first computing environment, the external system operating on a server machine in a second computing environment that is different from and external to the enterprise computing environment;

responsive to the indication from the user of the content server in the first computing environment to share the item with the user of the external system in the second computing environment, making a copy of the item in the first computing environment;

sending, from the first computing environment to the second computing environment, information identifying the user of the external system and the copy of the item to the external system in the second computing environment such that the item and the copy of the system physically reside in separate systems;

establishing a link between the item in the repository managed by the content server in the first computing environment and the copy of the item in the external system in the second computing environment, the establishing including associating the item in the repository in the first computing environment and the copy of the item in the external system in the second computing environment such that they are in a shared state through the link which is maintained and tracked through a tracking data structure maintained by the content server in the first computing environment, wherein the link established and maintained by the content server is revocable by the content server in the first computing environment;

locking the item in the repository to prevent editing of the item in the repository managed by the content server in the first computing environment;

updating the UI of the content server to indicate that the item in the repository is now shared and locked from editing via the UI of the content server in the first computing environment;

receiving an indication from the user of the content server to stop sharing the item with the user of the external system;

revoking the link between the item in the repository and the copy of the item in the external system, the revoking comprising deleting, from a tracking data structure maintained by the content server, information associated with a unique identifier for the copy of the item, the unique identifier received from the external system when the link was established;

notifying the external system that the item is no longer shared with the user of the external system; and updating the UI to indicate that the item in the repository is no longer shared and is now editable.

16. The computer program product of claim 15, wherein the establishing further comprises receiving a unique identifier for the copy of the item from the external system and storing, in the tracking data structure, the unique identifier for the copy of the item and a unique identifier for the item with a user identifier for the user of the content server.

17. The computer program product of claim 16, wherein the tracking data structure comprises a field for storing the unique identifier for the item in the content server, a field for storing the unique identifier for the copy of the item in the external system, a field for storing a version identifier of the item in the external system, a field for storing a version identifier of the item in the content server, and a field for storing the user identifier for the user of the content server.

18. The computer program product of claim 15, wherein the item comprises a file or a folder.

19. The computer program product of claim 15, wherein the instructions are further translatable by the processor for:

as the item in the repository is shared and locked from editing, dynamically changing the UI of the content server to provide a revoke share function for revoking the link between the item in the repository and the copy of the item in the external system.

20. The computer program product of claim 15, wherein the instructions are further translatable by the processor for:

retrieving a modified version of the copy of the item from the external system; and saving the modified version of the copy of the item as a new version of the item in the repository or replacing the item in the repository with the modified version of the copy of the item retrieved from the external system.

* * * * *